(12) United States Patent
Good

(10) Patent No.: US 8,185,820 B1
(45) Date of Patent: May 22, 2012

(54) SYSTEM AND/OR METHOD FOR DOCUMENT GENERATION

(75) Inventor: Charles Good, Cincinnatti, OH (US)

(73) Assignee: Adobe Systems Incorporated, San Jose, CA (US)

( * ) Notice: Subject to any disclaimer, the term of this patent is extended or adjusted under 35 U.S.C. 154(b) by 940 days.

(21) Appl. No.: 11/100,667

(22) Filed: Apr. 6, 2005

(51) Int. Cl.
*G06F 17/00* (2006.01)

(52) U.S. Cl. ........ 715/253; 715/234; 715/235; 715/236; 715/240; 715/243; 715/246; 715/247; 715/249; 715/273; 715/275; 715/277

(58) Field of Classification Search .................. 715/513, 715/517, 501.1, 776, 514, 523, 744, 522, 715/234–236, 243–253, 273–277; 707/E17, 707/4, 3; 717/105, 136; 709/224
See application file for complete search history.

(56) References Cited

U.S. PATENT DOCUMENTS

| | | | |
|---|---|---|---|
| 7,117,436 B1* | 10/2006 | O'Rourke et al. | 715/205 |
| 7,143,344 B2* | 11/2006 | Parker et al. | 715/236 |
| 7,243,098 B2* | 7/2007 | Wang et al. | 1/1 |
| 7,243,303 B2* | 7/2007 | Purvis et al. | 715/253 |
| 7,246,311 B2* | 7/2007 | Bargeron et al. | 715/251 |
| 7,272,789 B2* | 9/2007 | O'Brien | 715/247 |
| 7,359,909 B2* | 4/2008 | Ponessa | 1/1 |
| 7,383,499 B2* | 6/2008 | Kraft et al. | 715/246 |
| 7,395,497 B1* | 7/2008 | Chaulk et al. | 715/200 |
| 7,434,160 B2* | 10/2008 | Peiro et al. | 715/249 |
| 7,451,393 B1* | 11/2008 | Herbison et al. | 715/234 |
| 7,530,017 B2* | 5/2009 | Kinno et al. | 715/249 |
| 7,590,644 B2* | 9/2009 | Matsakis et al. | 1/1 |
| 7,640,496 B1* | 12/2009 | Chaulk et al. | 715/243 |
| 7,733,509 B2* | 6/2010 | Buis et al. | 358/1.15 |
| 2002/0069192 A1* | 6/2002 | Aegerter | 707/1 |
| 2003/0058469 A1* | 3/2003 | Buis et al. | 358/1.15 |
| 2003/0071833 A1* | 4/2003 | Dantzig et al. | 345/700 |
| 2003/0189726 A1* | 10/2003 | Kloosterman et al. | 358/1.18 |
| 2004/0010753 A1* | 1/2004 | Salter et al. | 715/513 |
| 2004/0044965 A1* | 3/2004 | Toyama et al. | 715/523 |
| 2004/0194028 A1* | 9/2004 | O'Brien | 715/517 |
| 2004/0205469 A1* | 10/2004 | Mellor | 715/500 |
| 2004/0268247 A1* | 12/2004 | Rosenpflanzer et al. | 715/523 |
| 2004/0268249 A1* | 12/2004 | Fennelly et al. | 715/523 |
| 2005/0044197 A1* | 2/2005 | Lai | 709/223 |
| 2005/0050457 A1* | 3/2005 | Kurumatani | 715/513 |

(Continued)

OTHER PUBLICATIONS

W3C XPath Specification, Available at: http://www.w3.org/TR/xpath/ ; Nov. 16, 1999, W3C XPath specification.pdf.*

(Continued)

*Primary Examiner* — Doug Hutton, Jr.
*Assistant Examiner* — Benjamin Smith
(74) *Attorney, Agent, or Firm* — Robert C. Kowert; Meyertons, Hood, Kivlin, Kowert & Goetzel, P.C.

(57) ABSTRACT

Embodiments of methods, apparatuses, devices and systems associated with document generation are disclosed. For example, methods, apparatuses, devices, and systems associated with formatting content for display are disclosed. Including method apparatuses, devices, and systems to read a data file and a template file, create one or more sub-assemblies based at least in part on said template file and/or said data file; and execute one or more tags in said template file to populate said one or more sub-assemblies with data from said data file.

27 Claims, 4 Drawing Sheets

U.S. PATENT DOCUMENTS

| | | | |
|---|---|---|---|
| 2005/0097448 A1* | 5/2005 | Giannetti et al. | 715/508 |
| 2005/0097454 A1* | 5/2005 | Kinno et al. | 715/513 |
| 2005/0111044 A1* | 5/2005 | Giannetti | 358/1.18 |
| 2005/0125724 A1* | 6/2005 | Peiro et al. | 715/517 |
| 2005/0125728 A1* | 6/2005 | Peiro et al. | 715/523 |
| 2005/0132284 A1* | 6/2005 | Lloyd et al. | 715/517 |
| 2005/0206957 A1* | 9/2005 | Chia et al. | 358/1.18 |
| 2005/0216832 A1* | 9/2005 | Giannetti | 715/513 |
| 2005/0273772 A1* | 12/2005 | Matsakis et al. | 717/136 |
| 2006/0023238 A1* | 2/2006 | Blaszyk et al. | 358/1.13 |
| 2006/0179405 A1* | 8/2006 | Chao et al. | 715/517 |
| 2006/0212841 A1* | 9/2006 | Sinai et al. | 717/105 |
| 2006/0224952 A1* | 10/2006 | Lin | 715/517 |
| 2006/0249566 A1* | 11/2006 | Alleshouse | 235/375 |
| 2007/0162841 A1* | 7/2007 | Bailey et al. | 715/505 |

OTHER PUBLICATIONS

W3C XSLT Specification, Available at: http://www.w3.org/TR/xslt; Nov. 16, 1999, W3C XSLT specification.pdf.*

* cited by examiner

SYSTEM AND/OR METHOD FOR DOCUMENT GENERATION

BACKGROUND

Document generation tools and/or document templates may be capable of generating documents based at least in part on received and/or obtained data. In this context a document may comprise physical, electronic, and/or other representation of thought using conventional marks and/or symbols.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, methods, procedures, and/or components that would be understood by one of ordinary skill have not been described in detail so as not to obscure the described embodiments of claimed subject matter.

Figure 1:
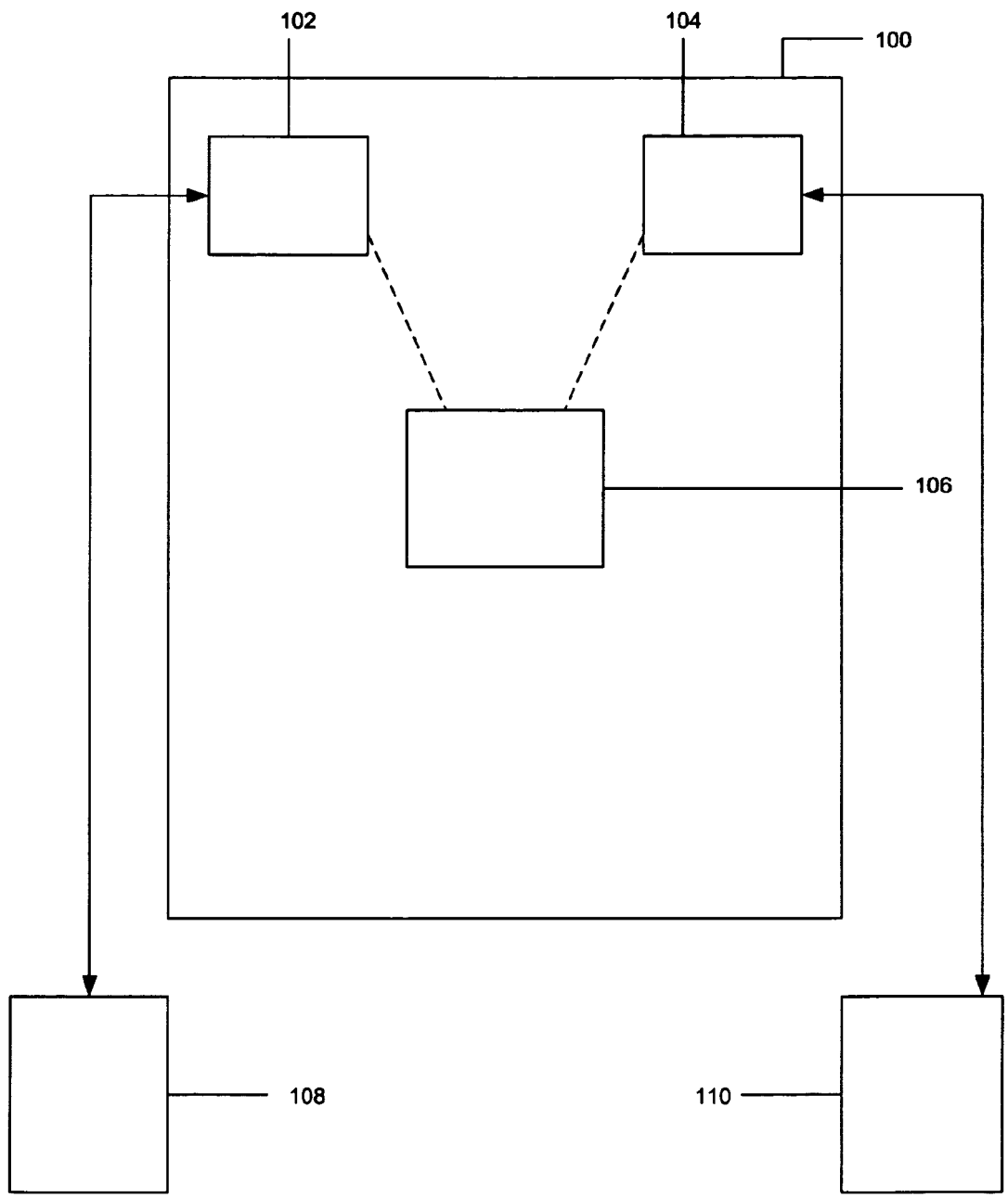
FIG. 1 is a schematic diagram of an embodiment of a document generation engine.

FIG. 1 is a diagram of an embodiment 100, such as a formatting engine, a content formatting engine, and/or a document generation engine in accordance with an embodiment. In this context a formatting engine, a content formatting engine and/or a document generation engine may mean a program, such as a set of instructions that when executed by a computing device and/or computing platform may be adapted to generate one or more documents. For example, without loss of generality, document generation engine 100 may comprise a program, such as a set of instructions, capable of being executed on a system, such as a computer system, a computing platform, a portable computer, a personal digital assistant, and/or other system, for example. Thus an embodiment in accordance with claimed subject matter may be executed on such a system, such as one of the embodiments described below, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example.

Document generation engine 100 may include various components, such as a data reader 102, a template reader 104, and/or a document generator 106, for example. In this context the above components may be objects invoked by document generation engine 100, sub-routines within document generation engine 100, and/or independent programs executed by document generation engine 100, for example. In this context an object may mean one or more computing device and/or computer platform executable instructions along with one or more data units and/or portions of data. In this context a data reader may mean an object adapted for interacting with a data file. In this context a template reader may mean an object adapted for interacting with a template file. In this context a document generator may mean an object adapted for generating a document based at least in part on a data file and/or at least in part on a template file. It should be noted that claimed subject matter is not limited in this regard. In this particular embodiment, data reader 102 may comprise software configured to receive a data file 108. For example, data reader 102 may receive a message including data file 108. Additionally, data reader 102 may comprise software adapted to obtain data file 108. For example, data reader 102 may receive a message including information as to the location of data file 108. In this example, data reader 102 may obtain data file 108 from the location. Though again it should be noted that claimed subject matter is not limited in this regard. Data reader 102 may be further configured to read and/or search the data file 108 such that a portion of data from data file 108 may be identified and/or located. Data from data file 108 may comprise data of a particular type, size, configuration, meta-data associated with one or more portions of data, and/or one or more of any of a number of characteristics pertaining to data within data file 108. Data file 108 may comprise data stored in a manner consistent with any of a variety of data formats. For example data file 108 may comprise data stored in a format compatible with extensible markup language (XML), and/or extensible stylesheet language transformation (XSLT), such as delimited text files, data returned from a database query, such as SQL, and/or the results of an XML XQuery, to name but a few examples. It should, or course, be noted that claimed subject matter is not limited in this regard.

In this particular embodiment, template reader 104 may comprise a program, such as a set of instructions that may be executable on a computing device and/or a computer platform, configured to receive and/or obtain a template file 110. For example, template reader 104 may receive a template file in a message. In addition, template reader 104 may be configured to receive a message including information as to the location of a template file. In this example, template reader may then obtain the template file from the location. In this context a template file may comprise one or more objects, one or more instructions, and/or one or more pieces of data stored in a format such as delimited text file, data returned from a database query, such as SQL, and/or the results of an XML XQuery, and/or other formats compatible with XML, XSLT, InDesign document, Quark document, vector graphics file, Scalable Vector Graphics file, raster graphics file such as a Photoshop compatible file, and/or any number of other formats, for example. It should again be noted that claimed subject matter is not limited in this regard. Document generation engine 100 may be configured to generate a document, as more fully discussed below, based at least in part on data file 108 and/or based at least in part on template file 110, for example.

Figure 2:
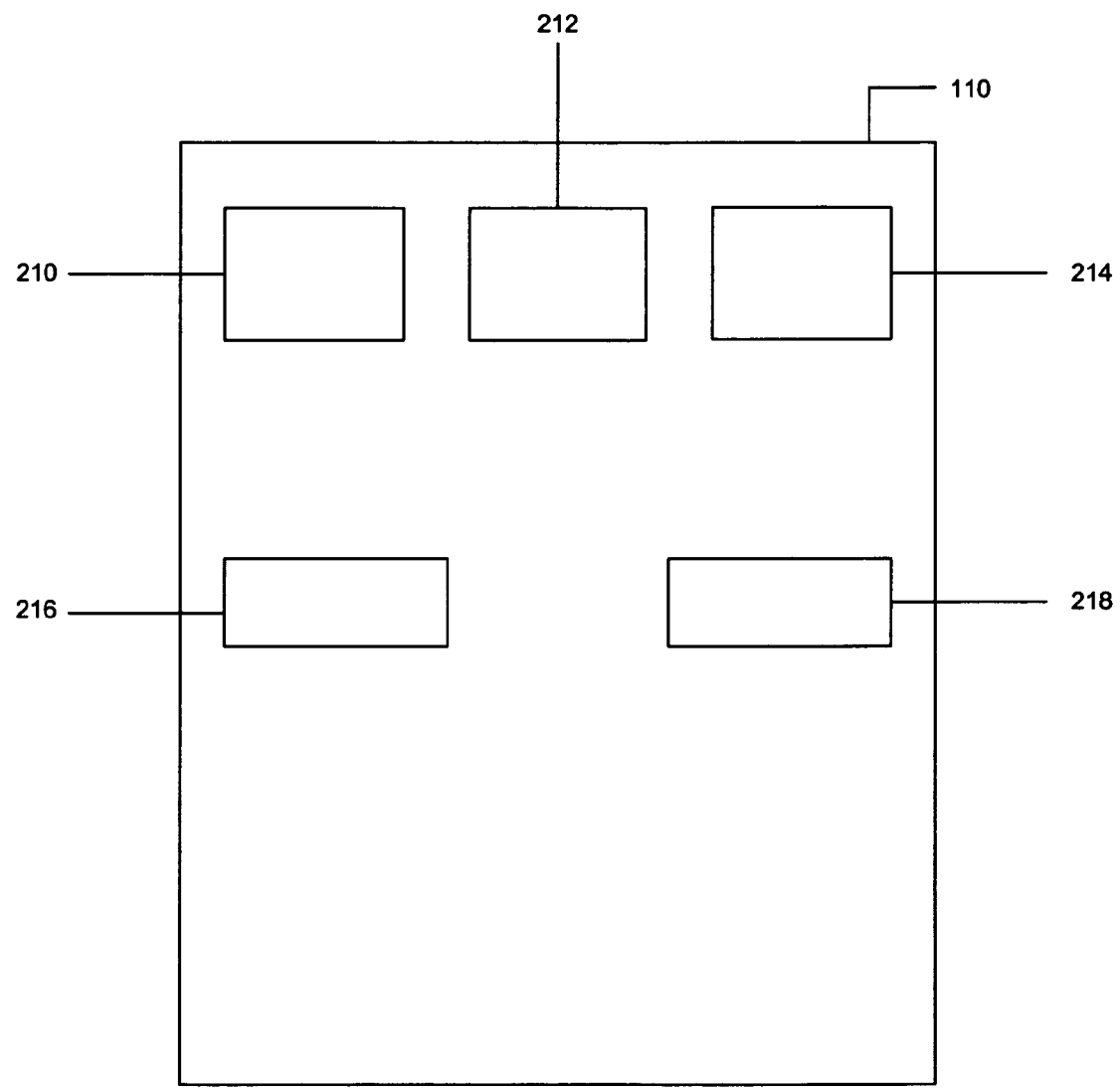
FIG. 2 is a schematic diagram of an embodiment of a template file.

FIG. 2 is a schematic diagram of template file 110 in accordance with an embodiment. In this context a template file may mean a file including instructions that may be executed by one or more programs and/or one or more computing systems to generate a document based at least in part on the template file. In this particular embodiment, template file 110 may comprise an instruction set, such as for generating a document populated with data, such as that from the received and/or obtained data file 108, for example. Template file 110 may further comprise one or more content transforming objects, such as hierarchical objects and/or sub-assemblies 210, 212, and/or 214. In this context, a content transforming object may mean an object including instructions adapted and/or configured to transform data. In this context transform may mean to change in composition or structure, to change the outward form or appearance of, and/or to change in character or condition. In this context hierarchical objects may mean one or more objects having a graded and/or ranked structure. In this context a sub-assembly may mean an object within a ranked structure. The one or more content transforming objects may comprise instructions that if executed may read a selected portion of data from data file 108. The one or more content transforming objects may further comprise instructions that if executed, for example, by document generation engine 100, may transform the selected portion of data from data file 108 such that, if displayed, the selected portion of data from data file 108 comprises data having determined and/or desired display characteristics. In this context, display characteristics may comprise size, font selection, color, layout, page location, and/or any of a number of other characteristics, to name but a few examples. It should be noted that claimed subject matter is not limited in this regard. The one or more content transforming objects may comprise one or more dynamic and/or static objects, text, text objects such as tables, for example, and/or graphical objects such as images, animations and/or the like. Furthermore, the one or more content transforming objects may comprise one or more nested content transforming objects, such that there may comprise hierarchical structure of related content transforming objects, for example. It should be noted that claimed subject matter is not limited in this regard.

Template file 110 may further comprise one or more tags, such as tags 216 and/or 218. In this context a tag may mean an object comprising one or more pieces of information relating to one or more portions of data and/or one or more instructions. The one or more tags, in this context, may comprise one or more instructions relating to how document generation engine 100 may interact with a selected portion of data file 108, for example. The one or more tags may comprise one or more data binding statements, such as one of those described below and/or other data binding statements, a script block, such as one or more instructions, and/or a name, for example. In this context a data binding statement may mean a statement including information relating to a location of one or more portions of data. For illustrative purposes, a script block of one or more tags may comprise Javascript, JScript, VBScript, Basic, Java, XSLT and/or one or more other types of interpretive language instructions and/or one or more commands, such as for forming, invoking, and/or creating an instance of one or more content transforming objects. The one or more data binding statements, may, in this context, further comprise a path to a selected node within template file 110, and/or a selected portion of data in data file 108. In this context a path may mean information as to the location of one or more nodes and/or one or more portions of data. By way of example, the one or more data binding statements may comprise an X-path, which in this context may comprise one or more instructions that may indicate a location at which document generation engine 100 may look for a selected portion of data in data file 108. An X-path may comprise an absolute X-path, such that document generation engine 100 and/or the one or more content formatting objects may be given a definite path to find the selected node and/or selected portion of data. Alternatively, an X-path may comprise a relative X-path, such that document generation engine 100 and/or the one or more content formatting objects may be given a path defined relative to a particular node in template file 110 and/or relative to a particular location in data file 108. The one or more tags may further comprise nested and/or iterative commands, such that the instructions and/or commands may comprise a hierarchical structure such that document generation engine 100 may traverse multiple passes through the instructions and/or commands of the one or more tags before completing the instructions.

Figure 3:
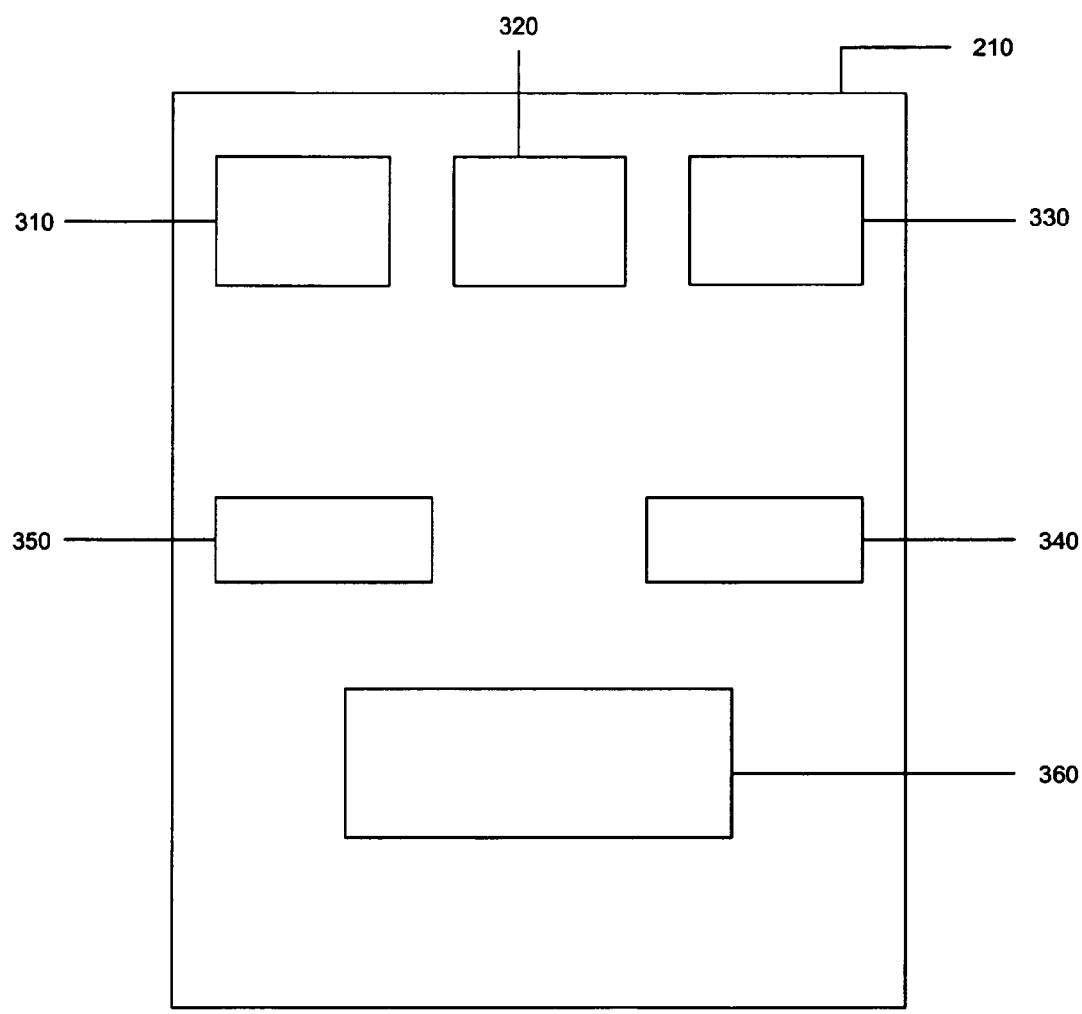
FIG. 3 is a schematic diagram of an embodiment of a content transforming object.

FIG. 3 is a schematic diagram of a content transforming object, such as a hierarchical object and/or sub-assembly 210, described above. Sub-assembly 210 may comprise one or more objects, such as nested transforming objects 310, 320, and 330. The nested transforming objects may comprise graphics objects; text transforming objects, static and/or dynamic text frames, static and/or dynamic image frames, text boxes, tables, graphics objects, images, and/or any other of a wide variety of data and/or content transforming objects, for example. In this context a content transforming object may mean an object having one or more instructions adapted to transform one or more portions of data. In this context, the nested transforming objects may comprise objects having instructions that if executed, such as in response to a request from document generation engine 100, result in transforming a selected portion of data, such as by determining the data's position within a document, determining font and/or other characteristics for displaying the data, and/or determining a layout for the data, to name but a few examples. It should, of course, be noted that claimed subject matter is not limited in this regard.

Sub-assembly 210 may further comprise one or more nested sub-assemblies, such as nested sub-assemblies 340, 350, and/or 360, for example. In this context, sub-assembly 210 and/or any nested sub-assemblies may include, and/or reference to, but is in no way limited to, transformation related and/or other instructions from an associated tag, such as tag 216 and/or tag 218. In this context transformation may mean an act, process, and/or instance of transforming or being transformed. In this context, the one or more nested sub-assemblies may have characteristics similar to those of sub-assembly 210. Sub-assembly 210 may be configured to populate itself with and/or transform the selected portion of data based at least in part on one or more instructions in the one or more tags and/or one or more instructions in sub-assembly 210, for example. Again, it should be noted that claimed subject matter is not limited in this regard. By way of example, sub-assembly 210 may be configured to receive the selected portion of data, such as in a message. Additionally, sub-assembly 210 may be configured to obtain the selected portion of data, such as by receiving a message including information as to the location of the selected portion of data. Again, it should be noted that claimed subject matter is not limited in this regard. Sub-assemblies 212 and/or 214 may be similar in structure to sub-assembly 210, for example. However, sub-assemblies 212 and/or 214 may also, under some circumstances, differ from sub-assembly 210 in a variety of ways. For example, sub-assemblies 212 and/or 214 may be configured, and/or adapted to, interact with different selected portions of data file 108. For example, sub-assembly 212 may be configured and/or adapted to be populated with and/or transform a different portion of data file 108. Additionally, sub-assemblies 212 and/or 214 may be part of a different and/or the same hierarchical level as sub-assembly 210, such that document generation engine 100 may interact with and/or execute different sub-assemblies at different times based at least in part on their respective position within a hierarchical structure. It should be noted that various sub-assemblies may have any number of various relationships and relative positions, and claimed subject matter is in no way limited in this regard.

Figure 4:
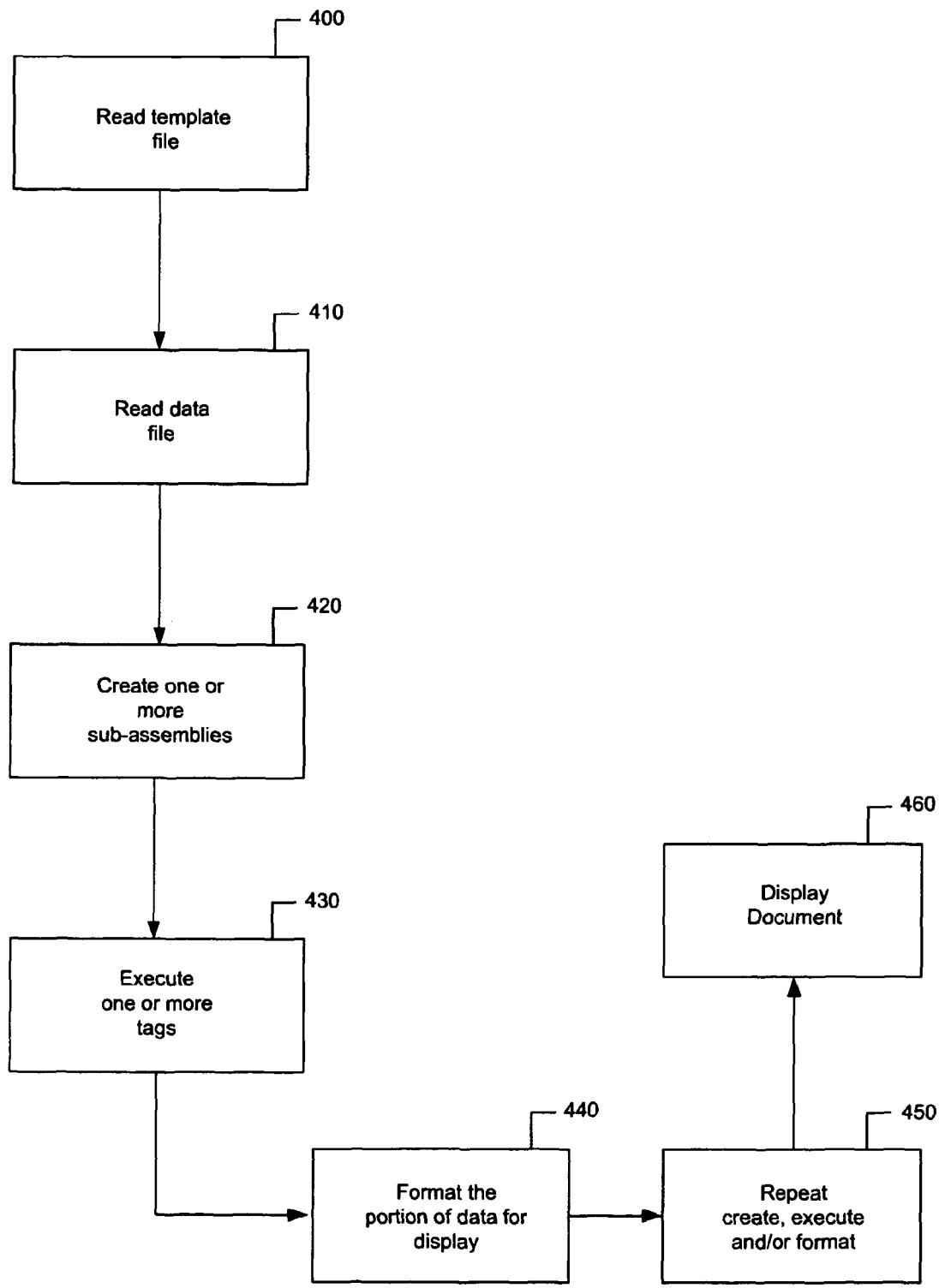
FIG. 4 is a flowchart of an embodiment of a method of generating a document.

FIG. 4 is a flowchart depicting an embodiment of a method of generating a document. With regard to box 400, a formatting engine, such as a content formatting engine and/or a document generation engine 100, may read a template file such as template file 110, for example. In this context, "read" may mean that the formatting engine reads, manipulates, and/or executes one or more tags, such as tags 216 and/or 218, one or more content formatting objects, such as one or more of the sub-assemblies 210, 212, and/or 214 described above, and/or any other objects and/or instructions that template file 110 may include, for example. With regard to box 410, the formatting engine may read, search and/or manipulate a data file, such as data file 108, for example. With regard to box 420, the formatting engine may invoke, form and/or create an instance of one or more hierarchical objects and/or sub-assemblies based at least in part on the template file and/or based at least in part on the data file. For example, the formatting engine may create one or more sub-assemblies based at least in part on the tags in the template file. As discussed above, the one or more tags may comprise one or more data binding statements, for example. Though, again, it should be noted that claimed subject matter is not limited in this regard. The data binding statements, depending on the circumstances, may comprise absolute and/or relative paths which the formatting engine and/or the one or more sub-assemblies may use to find a portion of data within the data file and/or a selected portion of the template file, for example. The portion of data may comprise data having a data type, associated meta-data, and/or other characteristics. Again, it should be noted that claimed subject matter is not limited in this regard. As discussed above, the one or more tags may further comprise one or more instructions, for example. The one or more instructions may, under some circumstances, comprise instructions for the formatting engine to form, create an instance of, and/or invoke one or more hierarchical objects and/or sub-assemblies for the portion of data within the data file. For example, if a data binding statement in one of the one or more tags directs the formatting engine to a portion of data that comprises product listings for a catalogue then the associated tag may comprise instructions for the formatting engine to create an instance of a sub-assembly configured to transform the product listings for display in a generated document. Though, again, it should be noted that claimed subject matter is not limited in this regard.

With regard to box 430, the formatting engine may execute one or more tags, such as by executing one or more of the instructions in the tag, for example. For example one or more instructions may comprise instructions for the formatting engine to extract the portion of data, such as a portion having a first data content type, from the data file. In addition, one or more instructions may further comprise instructions for the formatting engine to form, create an instance of, and/or invoke a one or more hierarchical objects and/or one or more sub-assemblies, such as a first content type object, for example, adapted and/or configured to transform the portion of data. Further one or more instructions may comprise one or more instructions for the formatting engine to send the extracted data to the created sub-assembly and/or sub-assemblies adapted, and/or configured to transform the portion of data. Additionally, the one or more sub-assemblies may contain instructions that if executed may result extracting the portion of data from the data file, for example. Again, it should be noted that claimed subject matter is in no way limited in this regard.

With regard to box 440, the one or more sub-assemblies may transform the portion of data for display in a generated document. For example, the one or more sub-assemblies may include instructions for determining a layout and/or a position within the generated document for the portion of data. In addition, the one or more sub-assemblies may include instructions for determining a font, a size, a color, and/or any other display related parameter for the portion of data, for example. Again, it should be noted that the above examples are provided for illustrative purposes only and claimed subject matter is not limited in this respect.

With regard to box, 450, formatting engine may, depending at least in part on the data file and/or at least in part on the template file, make additional passes through the template file, for example. In this context, a pass may mean to proceed through a file, such as proceeding from the beginning of the file to the end of the file. By way of example, a first tag of the one or more tags may comprise instructions to create an instance of one or more hierarchical objects and/or one or more sub-assemblies, such as a first sub-assembly and/or a second sub-assembly. The first sub-assembly may comprise instructions for creating one or more nested sub-assemblies. Furthermore, the one or more nested sub-assemblies may comprise instructions for creating one or more additional sub-assemblies, for example. In this context, the nested sub-assemblies are not limited in number and/or in functionality. In light of this, the formatting engine may make multiple passes through a single tag and/or sub-assembly in order to create and/or populate the appropriate sub-assemblies for transforming a selected portion of data from the data file for display. The content formatting engine may handle this in a number of ways, and claimed subject matter is not limited in this regard. For example, the formatting engine may execute tags at particular hierarchical level on a first pass through the template file. In this context; executing a tag may comprise executing one or more instructions in the tag, such as extracting a first selected portion of data and/or creating an instance of one or more first sub-assemblies. On this first pass, the content formatting engine may make additional passes through the tags such that more instructions are executed on subsequent passes before moving to a different hierarchical level of tags, for example. Alternatively, the content formatting engine may, on this first pass, execute tags at more than one hierarchical level, while executing further instructions on subsequent passes. In addition, the content formatting engine may be configured to create and/or populate one or more sub-assemblies at a particular hierarchical level before making a pass through the one or more sub-assemblies at the particular hierarchical level to create and/or populate one or more sub-assemblies nested in sub-assemblies at the particular hierarchical level, for example. Alternatively, content formatting engine may be configured to make additional passes through a particular sub-assembly such that nested sub-assemblies may be created and/or populated before the content formatting engine moves to one or more other sub-assemblies at the same hierarchical level as the particular sub-assembly, for example. Additionally, the content formatting engine may take any number of approaches to create and/or populate sub-assemblies at one or more hierarchical levels, and/or arranged in other relative structures and the above examples are provided for illustrative purposes only. Though, again, it should be noted that claimed subject matter is not limited in this regard.

With regard to box 460, the formatting engine may be capable of and/or configured to, upon completion of executing a template file, generate and/or display a document based at least in part on the template file and/or at least in part on the data file. For example, after the formatting engine has passed through and/or executed the appropriate tags and/or content transforming objects such that content transforming objects are populated with associated data that has been transformed for display, the formatting engine and or document generator 106 may generate a document for display and/or other uses. Though, again, it should be noted that claimed subject matter is not limited in this regard. The position, format, layout, and/or other characteristics of a selected portion of data in the generated document may be based at least in part on instructions and/or attributes of the template file, an associated content transforming object, an associated tag, and/or on at least a portion of the selected portion of data, such as associated meta-data for example. Again, it should be noted that claimed subject matter is not limited in this regard.

It will, of course, also be understood that, although particular embodiments have just been described, the claimed subject matter is not limited in scope to a particular embodiment or implementation. For example, one embodiment may be in hardware, such as implemented on a device or combination of devices, as previously described, for example. Likewise, although the claimed subject matter is not limited in scope in this respect, one embodiment may comprise one or more articles, such as a storage medium or storage media. This storage media, such as, one or more CD-ROMs and/or disks, one or more computer memory components, and/or other data storage media, for example, may have stored thereon instructions, that when executed by a system, such as a computer system, computing platform, or other system, for example, may result in an embodiment of a method of content formatting and/or document generation in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A system, comprising:
 a memory storing instructions; and
 one or more processors capable of executing the instructions for generating a document based on a template file and a file;
 wherein said template file comprises a plurality of content transforming objects which determine formatting and layout for portions of data in the document, wherein at least one of said plurality of content transforming objects determines at least one of formatting or layout for a plurality of different portions of the document;
 wherein at least one of the plurality of content transforming objects includes a plurality of instructions for extracting the portions of data from the file for formatting in the document;
 wherein at least one of the plurality of content transforming objects includes a plurality of instructions for formatting the portions of data in the document according to one or more display characteristics;
 wherein at least one of the plurality of content transforming objects includes a plurality of instructions for determining layout positions within the document for the portions of data;
 wherein said generating the document based on the template file and the file comprises executing the instructions for the plurality of content transforming objects, wherein said executing comprises extracting the portions of data from the file, formatting the extracted portions of data according to the one or more display characteristics, and placing the extracted portions of data in the document according to the layout positions;
 wherein at least two of the plurality of content transforming objects are nested in a hierarchical structure, such that instructions for the at least two of the plurality of content transforming objects are executed in a nested manner to format data; and
 wherein designation of one or more of the plurality of content transforming objects to be executed multiple times is received, wherein only the instructions in the one or more designated content transforming objects are executed multiple times, in multiple passes through the one or more designated content transforming objects, to format different portions of the data.

2. The system of claim 1, wherein said file comprises a plurality of data content types.

3. The system of claim 1, wherein at least one of the portions of data further comprises metadata.

4. The system of claim 3, wherein said generating further comprises transforming said at least one portion of data based at least in part on said metadata.

5. The system of claim 1, wherein said plurality of content transforming objects comprise at least a first content type object adapted to transform a first content type and a second content type object adapted to transform a second content type.

6. The system of claim 1, wherein said generating further comprises populating one of the plurality of content transforming objects with at least one of the portions of data from said file.

7. A method of generating a document for display comprising:
 with a computing platform, reading a data file and a template file, wherein said template file comprises a plurality of content transforming objects which determine formatting and layout for portions of data in the document, wherein at least one of said plurality of content transforming objects determines at least one of formatting or layout for a plurality of different portions of the document;
 wherein at least one of the plurality of content transforming objects includes a plurality of instructions for extracting the portions of data from the data file for formatting in the document;

wherein at least one of the plurality of content transforming objects comprises a plurality of instructions for formatting the portions of data in the document according to one or more display characteristics;

wherein at least one of the plurality of content transforming objects includes a plurality of instructions for determining layout positions within the document for the portions of data;

wherein said generating the document based on the template file and the data file comprises:

with said computing platform, executing the instructions for the plurality of content transforming objects, wherein said executing comprises extracting the portions of data from said data file, formatting the extracted portions of data from said data file according to the one or more display characteristics, and placing the extracted portions of data from said data file in the document according to the layout positions;

wherein at least two of the plurality of content transforming objects are nested in a hierarchical structure, such that instructions for the at least two of the plurality of content transforming objects are executed in a nested manner to format data; and wherein designation of one or more of the plurality of content transforming objects to be executed multiple times is received, wherein only the instructions in the one or more designated content transforming objects are executed multiple times, in multiple passes through the one or more designated content transforming objects, to format different portions of the data.

8. The method of claim 7, wherein each one of the plurality of content transforming objects is associated with at least one tag.

9. The method of claim 8, wherein the at least one tag comprises a plurality of instructions for the associated one of the plurality of content transforming objects.

10. The method of claim 9, and further comprising transforming at least one of the portions of data for display.

11. The method of claim 10, wherein transforming said at least one portion of data is based at least in part on an aspect of the at least one tag associated with one of the plurality of content transforming objects which corresponds to the at least one portion of data.

12. The method of claim 11, wherein transforming said at least one portion of data comprises executing an instruction associated with the at least one tag.

13. The method of claim 10, wherein transforming said at least one portion of data comprises executing one or more instructions in said template file.

14. The method of claim 10, wherein transforming said at least one portion of data comprises transforming said extracted portions of data based at least in part on a data type associated with the at least one portion of data.

15. A system comprising:

means for generating a document based at least in part on a data file received by a computing platform and a document template, wherein the document template comprises a plurality of content transforming objects which determine formatting and layout for portions of data in the document, wherein at least one of the plurality of content transforming objects determines at least one of formatting or layout for a plurality of different portions of the document;

wherein at least one of the plurality of content transforming objects includes a plurality of instructions for extracting the portions of data for formatting in the document;

wherein at least one of the plurality of content transforming objects comprises a plurality of instructions for formatting the portions of data in the document according to one or more display characteristics;

wherein at least one of the plurality of content transforming objects includes a plurality of instructions for determining layout positions within the document for the portions of data;

wherein said generating the document comprises executing the instructions for the plurality of content transforming objects, wherein said executing comprises extracting the portions of data from the data file, formatting the extracted portions of data according to the one or more display characteristics, and placing the extracted portions of data in the document according to the layout positions;

wherein at least two of the plurality of content transforming objects are nested in a hierarchical structure, such that instructions for the at least two of the plurality of content transforming objects are executed in a nested manner to format data; and means for receiving designation of one or more of the plurality of content transforming objects to be executed multiple times, wherein only the instructions in the one or more designated content transforming objects are executed multiple times, in multiple passes through the one or more designated content transforming objects, to format different portions of the data.

16. An article comprising: a storage media having stored thereon instructions that are executed by a computing platform to generate a document:

wherein said generating comprises:

reading a data file and a template file, wherein said template file comprises a plurality of content transforming objects which determine formatting and layout for portions of data in the document, wherein at least one of said plurality of content transforming objects determines at least one of formatting or layout for a plurality of different portions of the document;

wherein at least one of the plurality of content transforming objects includes a plurality of instructions for extracting the portions of data from the data file for formatting in the document;

wherein at least one of the plurality of content transforming objects comprises a plurality of instructions for formatting the portions of data in the document according to one or more display characteristics;

wherein at least one of the plurality of content transforming objects includes a plurality of instructions for determining layout positions within the document for the portions of data;

executing the instructions for the plurality of content transforming objects, wherein said executing comprises extracting the portions of data from said data file, formatting the extracted portions of data from said data file according to the one or more display characteristics, and placing the extracted portions of data from said data file in the document according to the layout positions;

wherein at least two of the plurality of content transforming objects are nested in a hierarchical structure, such that instructions for the at least two of the plurality of content transforming objects are executed in a nested manner to format data; and receiving designation of one or more of the plurality of content transforming objects to be executed multiple times, wherein only the instructions in the one or more designated content transforming objects are executed multiple times, in multiple passes through the one or more designated content transforming objects, to format different portions of the data.

17. The article of claim 16, wherein each one of the plurality of content transforming objects is associated with at least one tag.

18. The article of claim 17, wherein the at least one tag comprises a plurality of instructions for the associated one of the plurality of content transforming objects.

19. The article of claim 18, further comprising transforming at least one of the portions of data based at least in part on a portion of the at least one tag associated with one of the plurality of content transforming objects which corresponds to the at least one portion of data.

20. The article of claim 19, wherein transforming said at least one portion of data comprises executing an instruction associated with the at least one tag.

21. The article of claim 19, wherein transforming said at least one portion of data is based at least in part on instructions in said template file.

22. The article of claim 19, wherein transforming said at least one portion of data is based at least in part on a data type associated with said at least one portion of data.

23. An apparatus comprising:
one or more processors operable to receive a data file;
said one or more processors further operable to execute a document generation engine, wherein said document generation engine is adapted to:
read said data file and a template file and to generate a document based at least in part on the data file and at least in part on said template file, wherein said template file comprises a plurality of content transforming objects which determine formatting and layout for portions of data in the document, wherein at least one of the plurality of content transforming objects determines at least one of formatting or layout for a plurality of different portions of the document;
wherein at least one of the plurality of content transforming objects includes a plurality of instructions for extracting the portions of data from the data file for formatting in the document;
wherein at least one of the plurality of content transforming objects comprises a plurality of instructions for formatting the portions of data in the document according to one or more display characteristics;
wherein at least one of the plurality of content transforming objects includes a plurality of instructions for determining layout positions within the document for the portions of data;
wherein said generating the document comprises executing the instructions for the plurality of content transforming objects, wherein said executing comprises extracting the portions of data from said data file, formatting the extracted portions of data according to the one or more display characteristics, and placing the extracted portions of data in the document according to the layout positions;
wherein at least two of the plurality of content transforming objects are nested in a hierarchical structure, such that instructions for the at least two of the plurality of content transforming objects are executed in a nested manner to format data; and
receive designation of one or more of the plurality of content transforming objects to be executed multiple times, wherein only the instructions in the one or more designated content transforming objects are executed multiple times, in multiple passes through the one or more designated content transforming objects, to format different portions of the data.

24. The apparatus of claim 23, wherein each one of the plurality of content transforming objects is associated with at least one tag.

25. The apparatus of claim 24, wherein the at least one tag comprises one or more instructions for the associated one of the plurality of content transforming objects.

26. The apparatus of claim 25, further comprising transforming at least one of the portions of data, wherein said transforming comprises executing at least one of the one or more instructions associated with the at least one tag.

27. The apparatus of claim 25, wherein transforming said at least one portion of data comprises modifying one or more display characteristics of said at least one portion of data.

* * * * *